(12) United States Patent
Beisel

(10) Patent No.: US 12,515,836 B2
(45) Date of Patent: Jan. 6, 2026

(54) CONTAINER HANDLING MACHINE FOOT

(71) Applicant: KHS GMBH, Dortmund (DE)

(72) Inventor: Michael Beisel, Schoeneberg (DE)

(73) Assignee: KHS GmbH, Dortmund (DE)

( * ) Notice: Subject to any disclaimer, the term of this patent is extended or adjusted under 35 U.S.C. 154(b) by 988 days.

(21) Appl. No.: 17/681,032

(22) Filed: Feb. 25, 2022

(65) Prior Publication Data

US 2022/0177170 A1   Jun. 9, 2022

Related U.S. Application Data

(63) Continuation-in-part of application No. PCT/EP2020/071779, filed on Aug. 3, 2020.

(30) Foreign Application Priority Data

Aug. 26, 2019 (DE) ........................ 102019122801.8

(51) Int. Cl.
| | | |
|---|---|---|
| A47B 91/02 | (2006.01) | |
| A47B 9/00 | (2006.01) | |
| B60S 9/08 | (2006.01) | |
| B65B 21/18 | (2006.01) | |
| B65D 71/50 | (2006.01) | |
| F16M 11/28 | (2006.01) | |

(52) U.S. Cl.
CPC .............. B65B 21/18 (2013.01); B65D 71/50 (2013.01); A47B 91/024 (2013.01); F16M 11/28 (2013.01); *F16M 2200/08* (2013.01)

(58) Field of Classification Search
CPC ................ A47B 91/024; A47B 91/022; A47B 2220/003; A47B 91/028; A47B 91/00; F16M 7/00; D06F 39/125; B66F 3/08; A47L 15/4253

USPC ........ 248/188.4, 188.2, 188.8; 254/100, 98; 16/19, 42 R
See application file for complete search history.

(56) References Cited

U.S. PATENT DOCUMENTS

| | | | |
|---|---|---|---|
| 3,858,833 A * | 1/1975 | Fink ...................... | A01K 97/10 248/533 |
| 4,627,591 A | 12/1986 | Heckmann | |
| 6,000,729 A * | 12/1999 | Williamson .......... | F16L 33/225 285/242 |
| 6,199,919 B1 * | 3/2001 | Kawasaki ........... | F16L 37/0985 285/256 |
| 6,520,461 B1 | 2/2003 | Graham | |
| 7,159,829 B1 | 1/2007 | Finkelstein | |

(Continued)

FOREIGN PATENT DOCUMENTS

| | | |
|---|---|---|
| CH | 698093 | 5/2009 |
| CN | 1411765 A | 4/2003 |

(Continued)

*Primary Examiner* — Mahdi H Nejad
(74) *Attorney, Agent, or Firm* — Laurence A. Greenberg; Werner. H. Stemer; Ralph E. Locher

(57) ABSTRACT

A container handling machine, such as a container filling machine or container closing machine, is used to handle containers, such as bottles, cans, and similar containers, which containers are configured to hold or contain a beverage, such as water, soft drinks, beer, wine, and juices, or a similar product for transport and consumption by consumers of beverages and similar products. Such container handling machines are usually supported on container handling machine feet, which can be adjusted in height.

16 Claims, 5 Drawing Sheets

(56) References Cited

U.S. PATENT DOCUMENTS

| | | | |
|---|---|---|---|
| 10,869,984 B2 * | 12/2020 | Worley | ............ A61M 16/0488 |
| 2006/0186288 A1 | 8/2006 | Levine | |
| 2011/0187247 A1 | 8/2011 | Carter | |

FOREIGN PATENT DOCUMENTS

| | | | |
|---|---|---|---|
| CN | 207112239 U | 3/2018 | |
| CN | 208988120 U | 6/2019 | |
| DE | 102016118047 | 3/2018 | |
| DE | 102019122801 B3 * | 12/2020 | ............ B65B 21/18 |
| EP | 0481330 A1 | 4/1992 | |
| EP | 1021972 | 7/2000 | |
| EP | 1021972 A1 * | 7/2000 | ............... A47B 9/00 |
| JP | 10211046 A * | 8/1998 | |
| WO | 2015192849 | 12/2015 | |

\* cited by examiner

CONTAINER HANDLING MACHINE FOOT

CROSS-REFERENCE TO RELATED APPLICATIONS

The present application is a Continuation-in-Part of International Patent Application No. PCT/EP2020/071779, filed Aug. 3, 2020, which claims the benefit of Federal Republic of Germany Patent Application No. DE102019122801.8, filed Aug. 26, 2019, each of which is incorporated by reference herein in its entirety.

BACKGROUND INFORMATION

1. Technical Field

This application relates to a bottle or container handling machine foot to support a bottle or container handling machine for handling containers, such as bottles, cans, or similar containers, for containing liquids, such as beverages or other liquid products, which machine foot support structure can be a height-compensating or vertically-adjustable machine foot for container handling machines.

2. Background Art

This section is for informational purposes only and does not necessarily admit that any publications discussed or referred to herein, if any, are prior art. Machine feet have long been known. In principle, machine feet are used for setting up machines or systems, wherein the machine feet can, as a rule, be mounted on frame parts of the machine or on the machine body, and, as load-bearing machine feet, must bear the load of the respective machine or the pressure taking effect due to the load. Such machine feet are in most cases configured such as to be height-compensating, that is, they are adjustable in height and/or length in order to support different machines and machine components of different designs and heights or vertical positions with respect to the ground or floor of a machine plant or building.

One use of machine feet or foot support structures is in the beverage bottling or container filling industry. Container filling machines, such as beverage bottle filling machines, or simply filling machines, are used in the container or beverage bottle filling or bottling industry to fill containers, such as beverage bottles, with a liquid beverage. Such machines can be of a rotary or linear design. Rotary beverage bottle filling machines include a rotary carousel or rotor or similar structure that has a plurality of individual beverage bottle filling devices or beverage bottle filling stations mounted or positioned on the perimeter or periphery thereof. In operation, an individual beverage bottle is received or picked up from a bottle or container handling device or machine, such as another bottle treatment machine or a container transport or conveyor, which can be either of a rotary or linear design, and held at a corresponding individual filling device or station. While the rotary carousel rotates, each individual filling device or filling station dispenses a beverage, such as soft drinks and sodas, wine, beer, fruit juices, water, or other beverages, or another liquid product. Each individual filling device is usually designed to fill one beverage bottle or similar container at a time. Upon completion of filling, the beverage bottle or container is released or transferred to yet another bottle or container handling device or machine, such as another bottle treatment machine or transport device. The filling devices are therefore designed to fully dispense a predetermined or desired amount or volume of product into the beverage bottles or containers before the beverage bottles or containers reach the exit or transfer position out from the filling machine. The beverage bottle filling machine can also be of a linear design, wherein beverage bottles are moved to one or more filling positions along a straight or linear path.

Such filling machines are usually part of a filling or bottling plant, wherein the filling machine operates in conjunction with a number of other beverage bottle or container handling machines, such as a closing machine for placing caps or closures on filled containers, a container manufacturing machine for making or forming containers to be filled, and a container packaging machine for packaging individual containers for shipment and sale to consumers. Such plants are designed to operate as quickly and continuously as possible, and any interruptions in operation result in a loss of productivity and an increase in operating costs, especially since such plants can process large numbers of containers, such as, for example, anywhere from ten to seventy thousand containers per hour or possibly more.

The plant is generally a single large building or warehouse, or possibly multiple buildings, with either a single large room or multiple rooms that house the different container handling machines. Most container handling machines have parts and components that are elevated off of the floor of the plant, often supported on a table or similar framework. These parts, components, tables, framework, and other portions are supported on machine feet or legs or similar. The machine feet serve different purposes. First, the machine feet simply support the weight of the machine on the floor of the plant. Second, the machine feet position and/or support the machine portions at a desired or required vertical height with respect to the horizontal floor of the plant. Third, the machine feet receive and/or absorb and/or transfer forces generated by the weight of the machine and the operation of the machine. The machine feet thereby provide a stable support that minimizes disruptive forces, such as vibrations, that could negatively impact the operation of the machine.

However, machine feet used in beverage bottle or container handling machines can be subject to the build up of materials thereon. For example, if a beverage bottle or container breaks or is damaged during handling, it is possible for liquid beverage or other liquid products to be spilled onto the machine feet. This could result in the build up of dirt or liquid residues or similar materials on the outer surfaces of the machine feet, and possibly even the inner surfaces if there are gaps or openings or seams through which liquid could pass. This build up of dirt and other such materials needs to be removed from the machine feet to promote optimal conditions for filling the beverage bottles or containers with a liquid beverage or other liquid products. This removal or cleaning or treatment is often necessary with machines in hygienically sensitive areas, such as the food production and processing sector, and the pharmaceutical industry, wherein the machine feet must also satisfy the strict hygiene requirements which apply in these sectors. In this situation, design and construction standards are to be maintained which can be specified and determined by the applicable machine guidelines and the corresponding hygiene guidelines.

Such hygiene guidelines are issued, for example, by certain organizations or state institutions, such as the "European Hygienic Engineering & Design Group" (EHEDG), the "3-A Sanitary Standards, inc." (3-A), or the "US Department of Agriculture" (USDA). In this situation, individual machine parts, such as machine feet, can be configured to allow for easy cleaning and to fulfill the corresponding requirements for cleanliness, and can also be configured to minimize or prevent residues, such as product residues, from being deposited on the machine feet, and can be configured to allow any dirt contamination to be easily and thoroughly removed, such that, undesirable bacteria formation can be reliably prevented or minimized.

One known example of leveling feet or height-compensating feet for such hygiene applications is a hygienic height-compensating foot which comprises a connecting foot with a footplate and shaft, as well as an adjustment sleeve surrounding the shaft. Provided on the shaft is an external thread with a corresponding internal thread on the adjustment sleeve. By the rotation of the adjustment sleeve in relation to the shaft, the adjustment sleeve can be displaced upwards and downwards. By means of an additionally provided flange, a device support foot in the form of a hollow cylinder can be mounted on the adjustment sleeve such as to be load-bearing. In order to improve the hygienic properties, an axial extension of the external thread portion and a length of the adjustment sleeve can be selected in such a way that the external thread does not lie exposed at any time, regardless of the adjustment of the adjustment sleeve.

A known example of a carrier unit comprises a tubular upper part and a tubular lower part, wherein the lower part is telescopically mounted in the upper part for an adjustable vertical movement. The upper part comprises a plastic support body, which is surrounded by a special steel support sleeve. A steel bolt with an external thread is additionally applied to the support body. The lower part comprises a tubular foot made of stainless steel with a plastic sliding body, which is located at the lower end of the lower part, and a metal insert which is located at the lower end of the lower part. The said metal insert has a central channel with an interior thread, which extends completely through the metal insert. The metal insert is bolted onto the lower end of the steel bolt, in order to allow for a vertical movement along the bolt.

Another known example of a height-compensating machine foot for hygienic applications, which likewise comprises a spindle with an external thread portion coupled to a standing foot, and a cylindrical load sleeve with an internal thread portion surrounding the spindle axially. By rotation relative to the spindle, the load sleeve can be moved in a vertical direction in relation to the spindle. By the corresponding use of ring-shaped seals the thread portion is protected against dirt contamination.

In one known example, the spindle consists essentially of a thread portion and an adjustment portion, wherein a lower part of the adjustable load sleeve with an internal seal is sealed on the adjustment portion of the spindle. On the upper side, a seal is likewise provided on the front of the load sleeve, which provides a seal towards the horizontal surface.

However, these known examples are generally limited to be suitable for short adjustment ranges and for spindles with relatively small diameters. In the case of container handling machines, such as, for example, filling machines, however, often very much greater adjustment ranges and configurations are required, and spindles with large diameters. It is also desirable in the hygiene sensitive sector of food production and processing, such as with regard to the applicable hygiene regulations, that, in addition to the sensitive thread portions or threaded portions, other or all function elements and/or projecting parts are configured so as to be covered.

SUMMARY

One object of at least one possible exemplary embodiment is to provide a machine foot for container handling machines which avoids the disadvantages of known examples discussed herein, and fulfills the hygiene requirements which apply despite being of simpler design and more economical manufacture.

To solve this object, a machine foot for container handling machines is configured in accordance with at least one possible exemplary embodiment, and a protective sleeve with in accordance with at least one possible exemplary embodiment. It should be understood that all of the features of at least one possible exemplary embodiment described herein are in principle the object of the invention, individually or in any desired combination, regardless of their relationship in the claims or reference to them.

In accordance with at least one possible exemplary embodiment, a machine foot for container handling machines comprises at least one height-compensating carrier unit extending along a main axis, and at least one support unit arranged coaxially to the carrier unit. In this situation, the carrier unit comprises at least one carrying spindle, connected to the base plate, and a load spindle axially surrounding portions of the carrying spindle, wherein the carrying spindle comprises at least one external thread portion and the load sleeve comprises at least one corresponding internal thread portion. The load sleeve is adjustably connected to the carrying spindle. The support unit rests on the load sleeve, and a top free end portion of the carrying spindle protrudes axially into an interior space of the support unit. In accordance with at least one possible exemplary embodiment, the machine foot further comprises a coaxially arranged protective sleeve running around the periphery, wherein the protective sleeve is arranged on the support unit so as to be movable in a vertical direction. In at least one vertical end position the protective sleeve shields at least the carrier unit against the environment.

The machine foot according to at least one possible exemplary embodiment is a height-displaceable or height-adjustable machine foot or adjusting foot or leveling foot or height-compensating foot, which is configured for hygiene applications, and can therefore also be understood as a hygienic machine foot or hygienic foot for machines.

The present machine foot is suitable for container handling machines, which in the meaning of the present invention are such machines or parts of a system as are used, for example, in the beverage industry for the handling of containers which are to be filled with liquids. As well as known container cleaning machines, labeling and/or printing machines, closing machines, etc., this also includes such container handling machines which are arranged, for example, in hygienically sensitive areas, or in sterile or aseptic areas of a system, such as blowing machines, filling machines, sterilizers, etc. The present machine foot can also be used, for example, in connection with transport or conveying lines, buffer stretches, and the like.

In accordance with at least one possible exemplary embodiment, the height-adjustable hygienic machine foot is configured as a load-bearing machine foot, wherein the container handling machine essentially represents the load, and the machine foot can be mounted on the underside of the container handling machine, for example by the machine foot being secured to the underside of a frame part or carrier part or to a part of the machine body. Due to the height adjustment capability, especially easy adjustment can be made to the state of the floor at the installation location of a container handling machine or to predetermined conditions in relation to the substrate in a production hall. Thanks to the height adjustment or height setting, it is also possible, over at least a specific adjustment range, for the working height of the corresponding machine to be determined. It is also possible, for example, for an inclination configured for specific applications to be achieved and precisely adjusted, namely an inclined alignment of the container handling machine, or an exact horizontal alignment, in an extremely simple manner.

In accordance with at least one possible exemplary embodiment, the protective sleeve is configured such that, at least in the vertical end position, all the components of the carrier unit located underneath down to the ground are completely covered or provided with a cladding, and therefore protected against the environment, such as against the surrounding area in a building or plant or even an external environment. In accordance with at least one possible exemplary embodiment, all the functional components are also protected, which are provided, for example, for the height adjustment or for possible anchoring of the machine foot in the hall floor.

In accordance with at least one possible exemplary embodiment, the protective sleeve therefore covers, at least in the vertical end position, all the exposed components in their entirety, such as those components of the carrier unit which are not accommodated in the interior of the support unit but which are arranged outside the support unit and are not covered by it or surrounded by it. As a result, all or essentially all of the components of the carrier unit are effectively protected against contamination and dirt, as well as against the penetration or depositing of product residues or handling media residues, or at least protected to an acceptable level of cleanliness. The protective sleeve can essentially be understood as cladding or covering or as a protection device, which shields the components of the carrier unit, such as all the functional components, against the surrounding area. Despite this, due to the arrangement of the protective sleeve on the support unit as being movable in the vertical direction, easy inspection and access for servicing are also possible.

Due to the protective sleeve provided, it is also possible for the machine foot to be height adjustable over a greater adjustment range in comparison with known examples of adjustable machine feet. For example, specifically, the external thread portion of the carrying spindle can extend along the main axis over a large part of the length of the carrying spindle, for example over more than a quarter or more than a third of the length, or approximately over half of the length or more than half, such as over two-thirds, of the length, since the entire carrying spindle is covered by the protective sleeve interacting with the support unit, and the functional thread portions are effectively protected. For example, an adjustment range of about 100 mm can be achieved, which is a relatively large adjustment range. It is also possible, with the machine foot according to at least one possible exemplary embodiment, for use to be made of carrying spindles with larger spindle diameters, as a result of which, for example, the load carrying capacity and support capacity are also increased. In other words, since the protective sleeve can be designed to be as long as a spindle and cover the entirety of the spindle when installed, a substantial portion or essentially all or all of the spindle can be threaded or have a threading along the length thereof to permit a maximized adjustment capacity with minimal to no risk of any portion of the threading being contaminated by contaminants, such as dirt, liquid residues, and biological contaminants.

According to at least one possible exemplary embodiment, the protective sleeve and the support unit are configured as essentially cylindrical in shape, such as in the form of hollow cylinders, and are arranged so as to be telescopically movable into and out of one another at least over a predetermined movement range. In this arrangement, the protective sleeve surrounds the support unit concentrically, for example, wherein an inner wall surface of the protective sleeve and an outer side of the support unit face towards one another. For the purpose of vertical displacement, the support unit and protective sleeve are coupled in a sliding manner.

In accordance with at least one possible exemplary embodiment, at least at one top sleeve end of the protective sleeve at least one first sealing element is provided, wherein the sealing element is arranged such as to provide a seal between the outer side of the support unit and the protective sleeve. The first sealing element provides a seal on the top sleeve end against the support unit, in such a way that no, or at least a minimal amount of, residues, dirt contamination, or the like, such as liquids running down along the support element, can penetrate into the interior of the protective sleeve. In accordance with at least one possible exemplary embodiment, the sealing element is configured and arranged such that it is indeed in a sealing position with the outer side of the support unit, but, at the same time, when the protective sleeve moves in the vertical direction, it is also possible for the sealing element to slide on the outer side of the support unit.

According to at least one possible exemplary embodiment, at least one second sealing element is provided in the region of an underside sleeve end of the protective sleeve, wherein the sealing element is arranged with sealing effect between a surface of the base plate and the protective sleeve. In a configuration of two sealing elements, a complete sealing covering of all the components of the carrying unit can be achieved. In this embodiment, the protective sleeve is therefore configured with two seals opposite one another in the axial direction.

In accordance with at least one possible exemplary embodiment, the first and/or the second sealing element are ring-shaped in the form of a sealing ring. In this situation, the protective sleeve comprises, in the region of its top sleeve end and/or in the region of its top sleeve end, a circumferential groove for the at least partial accommodation of the sealing ring. As an alternative, however, the sealing elements can also be configured as sealing lips. The sealing elements can be produced from any materials which are suitable for this purpose, such as from suitable materials which are approved in the food sector. The seals can be made, for example, from silicone.

In accordance with at least one possible exemplary embodiment, the protective sleeve in the vertical end position covers the carrier unit with sealing effect, such as covering completely and sealing against the surrounding environment.

In accordance with at least one possible exemplary embodiment, at least one connecting portion is provided at the underside sleeve end of the protective sleeve, in order to establish a detachable connection with the base plate. A detachable connection between the connecting portion of the protective sleeve and the base plate can also be understood in this situation as being a simple contact between a free edge of the connecting portion or the protective sleeve and a surface of the base plate. For example, such a contact or such a "being in contact" can be achieved by the laying or contacting of the lower edge on the base plate. The connecting portion can also be configured in such a way that it can be pushed over the base plate in the form of a collar or plugged onto the base plate.

In accordance with at least one possible exemplary embodiment, the connecting portion is configured so as to establish a detachable positive-fit connection with the base plate, such as to establish a latch connection or snap connection, and for this purpose comprises at least one projecting region serving as an engagement nose. The at least one projecting region can in this situation enter into a working connection with a corresponding latch element portion provided at the base plate, for example with a shoulder or rib of the base plate, such as, for example, a ring-shaped shoulder or ring-shaped rib.

It should be noted that a positive fit or positive force or positive guidance, in the context of this application, refers to a situation in which at least two components engage in a form fit, that is, at least a portion of an outer edge or boundary or surface of a first component substantially or essentially conforms to or fits within a corresponding portion of an inner edge or boundary or surface of a second component. This form fit between the two components results in the first component being retained against movement or displacement out of engagement with the second component. A common type of positive fit is when a first component is bound on at least one side or portion by a retaining structure, such as a side wall or guide surface, of a second component, such that, when a force is applied to move the first component in the direction of and against the retaining structure of the second component, the retaining structure resists movement or displacement of the first component, that is, the retaining structure acts like a wall or similar to block the movement. Male and female components that are connected by tabs or shoulders are another example of a positive or form fit. A positive guidance can occur when the first component is movable and the second component is a guide structure, wherein as the first component is moved into contact with the second component, the first component is deflected or guided along the path of movement defined or bounded by the second component. Again, the movement or displacement of the first component in a certain direction is resisted or blocked by the guide wall or surface of the second component, such that the first component is physically deflected or guided by the second component in a different direction or path of movement.

It should also be noted that a non-positive fit or non-positive force or non-positive guidance, in the context of this application, refers to a situation in which at least two components engage in a friction fit, that is, at least a portion of an edge or boundary or surface of a first component is in frictional engagement or contact with a corresponding portion of an edge or boundary or surface of a second component. This friction fit between the two components results in the first component being retained by friction against a sliding or translating movement or displacement with respect to the second component. A common type of non-positive fit is when a surface portion of the first component is positioned in contact with a corresponding or matching surface portion of the second component, such that, when a force is applied to move the first component along or across the surface portion of the second component, the friction between the surfaces at least resists movement or displacement of the first component, and prevents movement if the friction force is greater than the movement force. It is not uncommon for two components to engage in both a positive fit due to at least a partially matching or corresponding structural design that forms a retaining surface, and a non-positive fit due to frictional forces between surfaces of the components that are in frictional contact with one another. In such a situation, the positive fit and non-positive combine to produce a greater retaining or resisting force than would be generated or provided by one or the other alone.

For the positioning and location fixing of the protective sleeve, this can be displaced by vertical movement along the support unit, until the protective sleeve in the vertical end position seals all the components of the carrier unit against the outside. In order to fix the position of the sealing protective sleeve which is moved in this way, it can finally be clipped to the base plate in a simple manner, for example, by the latching or snap mechanisms described heretofore. Adjustment or maintenance work can be undertaken at any time, however, by releasing the latch or snap connection and corresponding movement or displacement upwards.

In other words, in accordance with at least one possible exemplary embodiment, after installation of the protective sleeve, the protective sleeve is detachably connected to a base plate of the machine foot, which base plate rests against the floor of a building or plant. If a worker wishes to access the components of the machine foot enclosed within or covered by the protective sleeve, the protective sleeve can be detached from the base plate and the protective sleeve can be moved axially away from the base plate toward the machine supported by the machine foot. The worker can then access the exposed portions of the machine foot to perform different maintenance functions, such as adjusting the length or height of the machine foot, cleaning components of the machine foot, adjusting base plate anchoring devices, and other such tasks. Upon completion of the maintenance functions, the protective sleeve can be moved axially away from the machine and toward the base plate until the end of the protective sleeve is re-attached or connected to the base plate and the components of the machine foot are again enclosed or covered by the protective sleeve.

In accordance with at least one possible exemplary embodiment, a securing portion is provided at a machine-side end of the support unit, facing away from the carrier unit, for securing to the container handling machine. For example, the securing portion is configured as a connection piece in the form of a cover or plate, or as a connection plate or connection flange. By using suitable securing and connecting devices or arrangements, for example, screws or bolts, the machine foot can in this situation be connected securely to a frame part or a machine body part of the container handling machine.

In accordance with at least one possible exemplary embodiment, the load sleeve comprises on the top a collar portion for the load-bearing accommodation of the support unit, wherein the support unit is mounted on the collar portion.

In accordance with at least one possible exemplary embodiment, the support unit comprises, at a contact end opposite the machine-side end, a floor portion with a central passage opening for the passage of the carrying spindle, wherein the floor portion of the support unit lies on the load sleeve, such as on the collar portion of the load sleeve. In accordance with at least one possible exemplary embodiment, the floor portion is connected to the load sleeve, such as with the collar portion of the load sleeve. Due to the floor portion lying flat on the collar portion, a uniform load distribution can be achieved. At the same time, the flat portions can, for example, be fixed by a screw connection, as a result of which a secure connection can be established between the support unit and the carrier unit.

In accordance with at least one possible exemplary embodiment, the protective sleeve is configured as multi-part, wherein several half-shell or part-shell shaped protective sleeve parts are connected to one another with sealing effect, such as in a detachable and still sealing manner, in order to form the protective sleeve running circumferentially. In such an embodiment, the protective sleeve can be removed relatively easily for the purposes of inspection or maintenance and then reattached. With this arrangement, too, in the event of a replacement of the protective sleeve being required, a relatively simple subsequent fitting is also possible.

The protective sleeve can be made of metal, such as special steel, or of plastic. The materials in this situation can be selected to meet all the requirements of the food industry or pharmaceutical industry, including the applicable hygiene regulations, such as the guidelines in accordance with 3-A, USDA, or EHEDG. For example, special steels of the AISI 304 or AISI 316 classes are suitable, or also various plastics, such as Teflon®.

In accordance with at least one possible exemplary embodiment, the materials used to produce the protective sleeve can be selected to exhibit a smooth surface condition, such that the surfaces are relatively easy to clean thoroughly. The material used can also be selected such that it exhibits adequate resistance to all the products and ancillary media used and processed in the sector of container handling machines. For example, corrosion-resistant materials can be used with adequate resistance to the cleaning and disinfection materials regularly used in the food industry.

If a plastic or similar material with elastic or flexible properties is used, it is also conceivable, for example, for the protective sleeve to be formed from an essentially flat piece of material, but curved in cylinder form, wherein the free longitudinal edges of the flat piece of material are arranged connecting to one another and are connected to one another with sealing effect along a connection line or seam line, such as being connected in a detachable manner and with sealing effect. With such an embodiment of the protective sleeve, this can be fitted subsequently in a manner, in that, with the protective sleeve being provided separately, first the connection of the longitudinal edges along the connection line or seam line is released, and the protective sleeve can be pushed over the support and carrier unit by a slight bending from the side, or laid around the support and carrier unit, and, finally, the sealing connection between the longitudinal edges is re-established.

In accordance with at least one possible exemplary embodiment, the machine foot is configured for anchoring in the ground or floor, and for this purpose comprises passage openings in the base plate, wherein corresponding anchoring devices, such as screw pins, for providing an anchoring engagement into the ground are introduced through the passage openings. In such an embodiment, the machine foot is configured as what is referred to as an earthquake-proof machine foot.

The present application also discloses a protective sleeve for a machine foot which comprises at least one height-adjustable carrier unit and a support unit, with which the carrier unit comprises at least one carrying spindle, connected to the base plate, with an external thread portion, and a load sleeve axially surrounding portions of the carrying spindle, with at least one corresponding internal threaded portion, wherein the load sleeve is adjustably connected to the carrying spindle, and the support unit rests on the load sleeve in such a way that a top free end portion of the carrying spindle protrudes axially into an interior space of the support unit. The protective sleeve is configured in the form of a hollow cylinder, and can be connected to the support unit in such a way that the protective sleeve runs around the support unit at the periphery and can be displaced in a vertical direction relative to the support unit. The protective sleeve is further configured and aligned such that, in a state in which it is connected to the support unit of the machine foot in at least one vertical end position, it covers the carrier unit against the surrounding environment.

DETAILED DESCRIPTION

Figure 1:
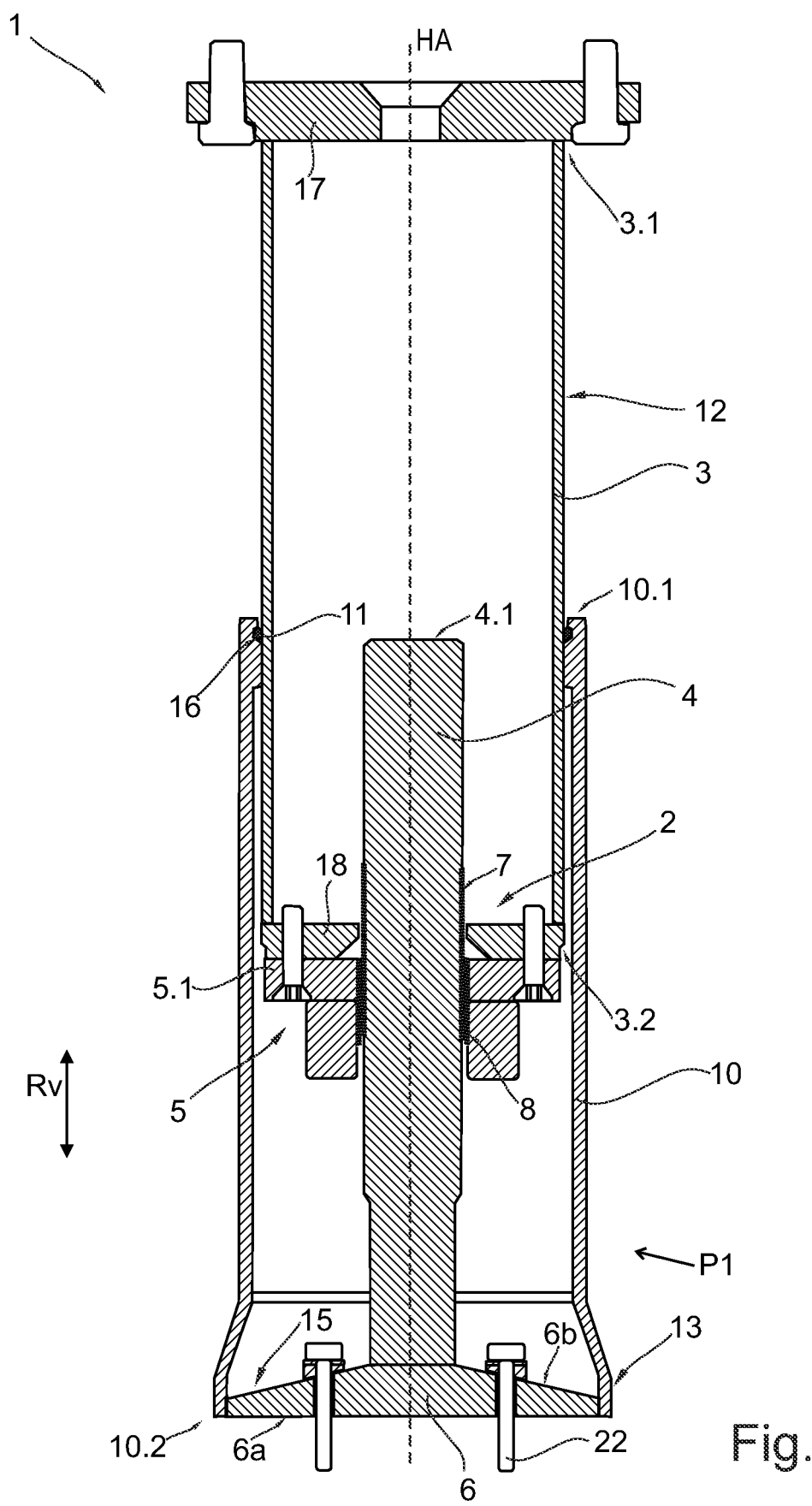
FIG. 1 shows a schematic representation of at least one possible exemplary embodiment of a container handling machine foot, in a longitudinal section along the main axis.
Figure 1A:
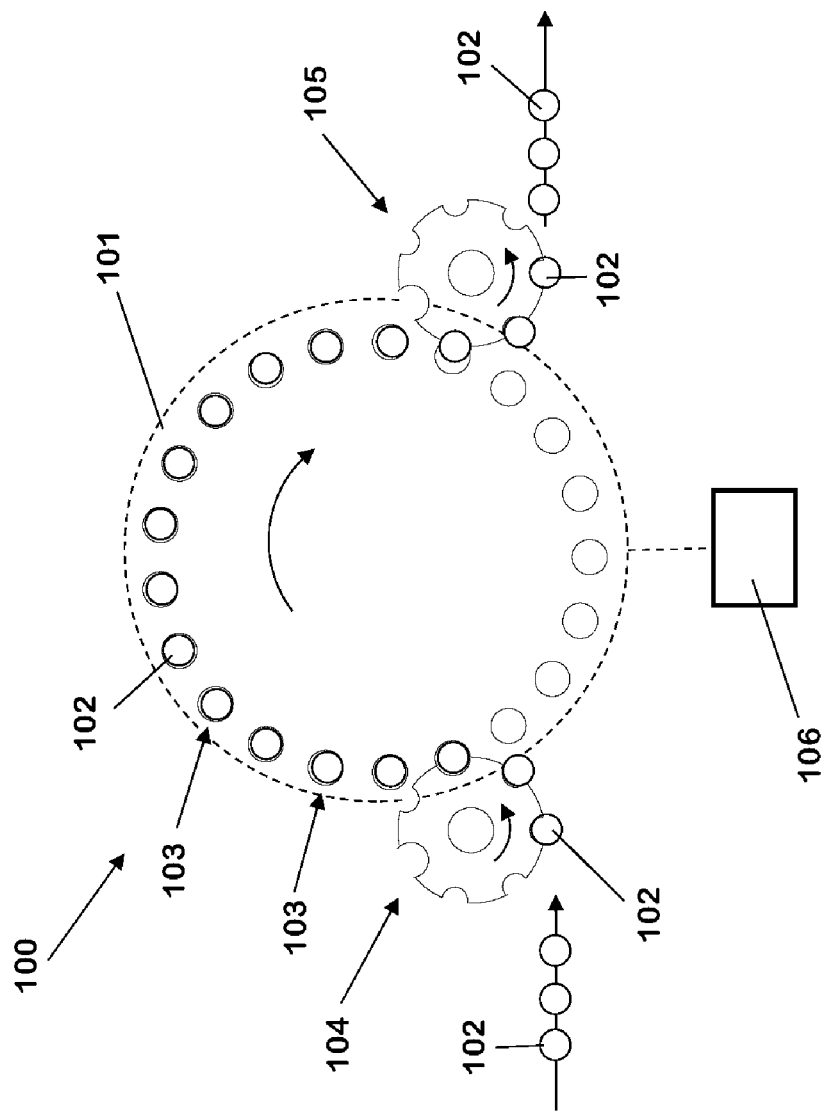
FIG. 1A shows a schematic top view of a container handling or beverage bottling machine in accordance with at least one possible exemplary embodiment.

FIG. 1A shows a schematic top view of a container handling or beverage bottling machine 100 for handling containers 102, such as bottles, cans, kegs, or similar containers, in accordance with at least one possible exemplary embodiment. The container handling machine 100 comprises a rotor or carousel 101 designed to rotate about a vertical axis of rotation. A plurality of container handling arrangements 103 are disposed about the periphery of the rotor 101. The container handling arrangements 103 can be designed to perform different functions depending on the container handling machine 100, such as container filling, closing, labeling, and other such container handling functions. A first rotary container transport device 104, such as a star wheel or similar device, moves containers 102 into the container handling arrangements 103. A second rotary container output device 105, such as a star wheel or similar device, moves containers 102 out of the container handling arrangements 103. A control arrangement 106, such as a computer control arrangement, is operatively connected to the container handling machine 100 to control and/or monitor the operation of the container handling machine 100 and the components thereof. Any one or more of the machines or devices can be supported on machine feet located on the floor of a building or plant.

FIG. 1 shows, in a rough schematic sectional representation, a machine foot 1 in accordance with at least one possible exemplary embodiment. The machine foot 1 extends its length along a main axis HA, which in the position of use of the machine foot 1 is oriented vertically. The machine foot 1 can be used, for example, for the load-bearing support of a container handling machine for handling containers, such as bottles, cans, or similar containers, not designated in any greater detail and not represented in the figures, such as for setting up such a container handling machine on a hall floor. The machine foot 1 is height-adjustable or height-compensating, and is therefore configured as what is referred to as a leveling foot.

The machine foot 1 comprises a height-compensating carrier unit 2, extending along the main axis HA, and a support unit 3 arranged coaxially to the carrier unit 2. The carrier unit 2 forms a bottom part of the machine foot 1, which faces towards the substructure and stands, for example, on the hall floor. The support unit 3 forms a top part of the machine foot 1, which faces towards the container handling machine and is available for securing the machine foot 1 to the container handling machine.

The height-compensating carrier unit 2 comprises a base plate 6 and a carrying spindle 4 connected to the base plate 6. The base plate 6, of which the underside 6a serves as a standing surface, and which can also be designated as a standing plate, ground plate, or standing foot, forms a holding base for the carrying spindle 4, which, for example, is secured by a receiving holder 9 (not represented in FIG. 1, see FIG. 2) to the base plate 6, such as in the region of a top side 6b of the base plate 6.

The carrying spindle 4 is formed by a longitudinal spindle, extending axially along the main axis HA, which in the example represented comprises a lower portion of a smaller diameter, and connected to this an upper portion of a larger diameter. The carrying spindle 4 is provided with an exterior thread portion 7, which in the embodiment shown extends in the axial direction only over a delimited part section in the upper portion, but which can of course extend over a longer region, or over almost the whole, or the whole, of the upper portion of the carrying spindle.

The carrying unit 2 further comprises a load sleeve 5, which surrounds the carrying spindle 4 axially in the form of a nut or sleeve, and through which the carrying spindle 4 passes axially. The load sleeve 5 comprises an interior thread portion 8 or threading, which corresponds to the exterior threaded portion 7 or threading of the carrying spindle 4, and is connected to the carrying spindle 4 in an adjustable manner by the meshing of the corresponding threads of the corresponding external and internal thread portions 7, 8. By the rotation of the load sleeve 5 in relation to the carrying spindle 4, the load sleeve 5 can be moved or displaced in a vertical direction Rv at least over an adjustment range axially along the transport spindle 4 and relative to it, wherein the adjustment range is determined, among other factors, by the axial extension of the external thread portion 7. Although not represented in the figures, provision is made, for the corresponding rotation of the load sleeve 5 against the carrying spindle 4, for suitable adjustment tool or wrench contact surfaces, at both the load sleeve 5 as well as at the carrying spindle 4, for the engagement of corresponding adjustment tools or wrenches.

The load sleeve 5 serves to provide load-bearing accommodation for the support unit 3, which is configured essentially in the form of a hollow cylinder, which finally rests on the load sleeve 5 connected to the carrying spindle 4, and in such a way that a top free end portion 4.1 of the carrying spindle 4 protrudes axially into an interior space of the support unit 3. For this purpose the load sleeve 5 comprises on the upper side a collar portion 5.1, on which a lower contact end 3.2 of the support unit 3 lies. The lower contact end 3.2 of the support unit 3 further comprises a floor section 18 with a central passage opening for the passage of the carrying spindle 4. The floor section 18 of the support unit 3 and the collar portion 5.1 of the load sleeve 5 are in this situation in surface contact with one another or lie face-to-face with one another. In the example shown, screw connections are introduced through the floor and collar sections 18, 15, in face-to-face contact, in order to fix the floor and collar sections 18, 15 against one another, and thereby connect the carrier unit 2 and the support unit 3 securely to one another.

The support unit 3 comprises, at an end 3.1 on the machine side, facing away from the carrier unit 2, a securing section 17, which is provided for the assembly installation and for securing to the container handling machine. In the present example, the securing section 17 is configured as a connection piece or connection plate in the form of a cover or plate, which, with the aid of suitable securing and connecting devices or arrangements, such as screws or bolts, can be securely connected to a frame part or to a machine body part of the container handling machine. The container handling machine, lying or resting on the securing section 17, therefore represents the load which in the final analysis is transferred by way of the support unit 3 onto the load sleeve 5 of the carrier unit 2, and is held in its totality. The forces generated by the load are therefore transferred in the axial direction.

Although not represented in FIG. 1, provision can also be made for suitable seals to be provided in the region of the load sleeve 5, which are arranged, for example, in the interior in the area of the passage of the load sleeve 5, and are in sealing contact against the surface of the carrying spindle 4. For example, corresponding seals can be arranged in the lower region of the load sleeve 5. In the upper region, provision can also be made for corresponding seals, which provide sealing towards the horizontal surface. In accordance with at least one possible exemplary embodiment, wherever two or more structures or portions of the machine foot 1, or the surfaces thereof, engage with or come into contact or face one another, a seal or sealing structure can be placed at or adjacent the area of engagement in order to provide sealing protection against the entry or passage of contaminants between the two or more structures or portions of the machine foot 1.

The machine foot 1 further comprises a protective sleeve 10, arranged coaxially or essentially coaxially and running around the periphery, which is likewise configured in the form of a hollow cylinder, and is coupled to the support unit 3 such as to be movable in the vertical direction Rv, and specifically in such a way that the protective sleeve 10 runs essentially concentrically around the support unit 3. The protective sleeve 10 is arranged relative to the support unit 3, and is configured and aligned in relation to its shape and dimensioning, in such a way that the protective sleeve 10 and the support unit 3 can be moved telescopically into and out of one another at least over a predetermined movement range. It should be understood that, in accordance with at least one possible exemplary embodiment, while a cylindrical shape is used for the sleeve 10 and support unit 3, essentially any shape or combination of shapes can be used as long as the sealing and covering functions are provided and the sleeve 10 is adjustable with respect to the support unit 3.

The protective sleeve 10 covers the carrier unit 2 in at least one vertical end position P1, and specifically all the elements of the carrier unit 2, such as those which are not covered or accommodated by the support unit 3. In this situation, in the vertical end position P1 the protection sleeve 10 covers the carrier unit 2 entirely and with sealing effect against the outside environment. An axial length of the protective sleeve 10 is in this situation selected in such a way that, in all situations, a complete coverage of the carrier unit 2 in the vertical end position P1 is ensured. In accordance with at least one possible exemplary embodiment, the axial length of the protective sleeve 10 corresponds approximately to an axial length of the carrier unit 2.

To further explain, as shown in FIG. 1, when the spindle 4 is installed, a first portion of the spindle 4 is located within the support unit 3 and the load sleeve 5, and a second portion is not. The protective sleeve 10 covers or encloses this second portion and the upper side 6b of the base plate 6 with respect to the surrounding environment to provide protection against contamination by contaminants, at least to a level or degree in accordance with a selected standard of cleanliness. If the protective sleeve 10 were not present, the second portion of the spindle 4 would be exposed to such contaminants. In addition, since the spindle 4 is axially adjustable to change the overall length of the machine foot 1, more of the spindle 4 can be moved out of the support unit 3 and load sleeve 5. However, since the protective sleeve 10 is movable and connected to the base plate 6, when the spindle 4 is axially adjusted, and thus the base plate 6 also moved, the protective sleeve 10 moves with the spindle 4 and base plate 6. Consequently, if and when an axial adjustment of the spindle 4 is performed, the second portion of the spindle 4 is always covered by the protective sleeve 10. Further, since the protective sleeve 10 is at least as long as the combined length of the spindle 4 and base plate 6, as viewed or measured along the axis HA, no matter the amount or degree or distance of the axial adjustment, the entirety of the second portion of the spindle 4 located outside of the support unit 3 and the load sleeve 5 will be covered by the protective sleeve 10. In addition, since the spindle 4 comprises an outer thread 7 to permit the axial adjustment, if the outer thread 7 covers or extends over a substantial portion of the length of the spindle 4, or possibly close to the entire length of the spindle 4, then the installed position of the spindle 4 and/or the axial adjustment could result in a portion of the outer thread 7, possibly a substantial portion, being located outside of the support unit 3 and the load sleeve 5. As mentioned above, if no protective sleeve 10 were present, this second portion of the spindle 4, and thus the outer thread 7, would be exposed to the surrounding environment and contaminants therein. This would present two substantial problems, the first being that threaded surfaces are particularly susceptible to contamination because of the increased surface area and the difficulty of cleaning contoured or threaded surfaces, as opposed to smooth or flat surfaces. The second problem is that a subsequent axial adjustment could result in contaminants located on the outer thread 7 being moved into the interior space or area within the support unit 3 and the load sleeve 5, which would ultimately require disassembly of the support unit 3 and the load sleeve 5 to permit cleaning of these interior spaces or areas. The protective sleeve 10 therefore allows for the outer thread 7 to be quite substantial in size or length, and thus permit substantial axial adjustment, because the portion of the outer thread 7 located outside of the support unit 3 and the load sleeve 5 is protected by the protective sleeve 10.

For the purpose of sealing on the top side, a first sealing element 11 is provided on a top side sleeve end 10.1 of the protective sleeve 10, which in the example shown is configured in ring shape as a sealing ring, and in the sealing position is arranged between an outer side 12 of the support unit 3 and the protective sleeve 10. The sealing ring 11 is in this situation in sealing contact against the outside 12 of the support unit 3 as well as against an inner wall region of the protective sleeve 10. In the example represented, the sealing ring 11 is accommodated partially in a circumferential groove 16 in the region of the top side sleeve end 10.1. It should be understood that other sealing structures or configurations are within the scope of the application.

Figure 2:
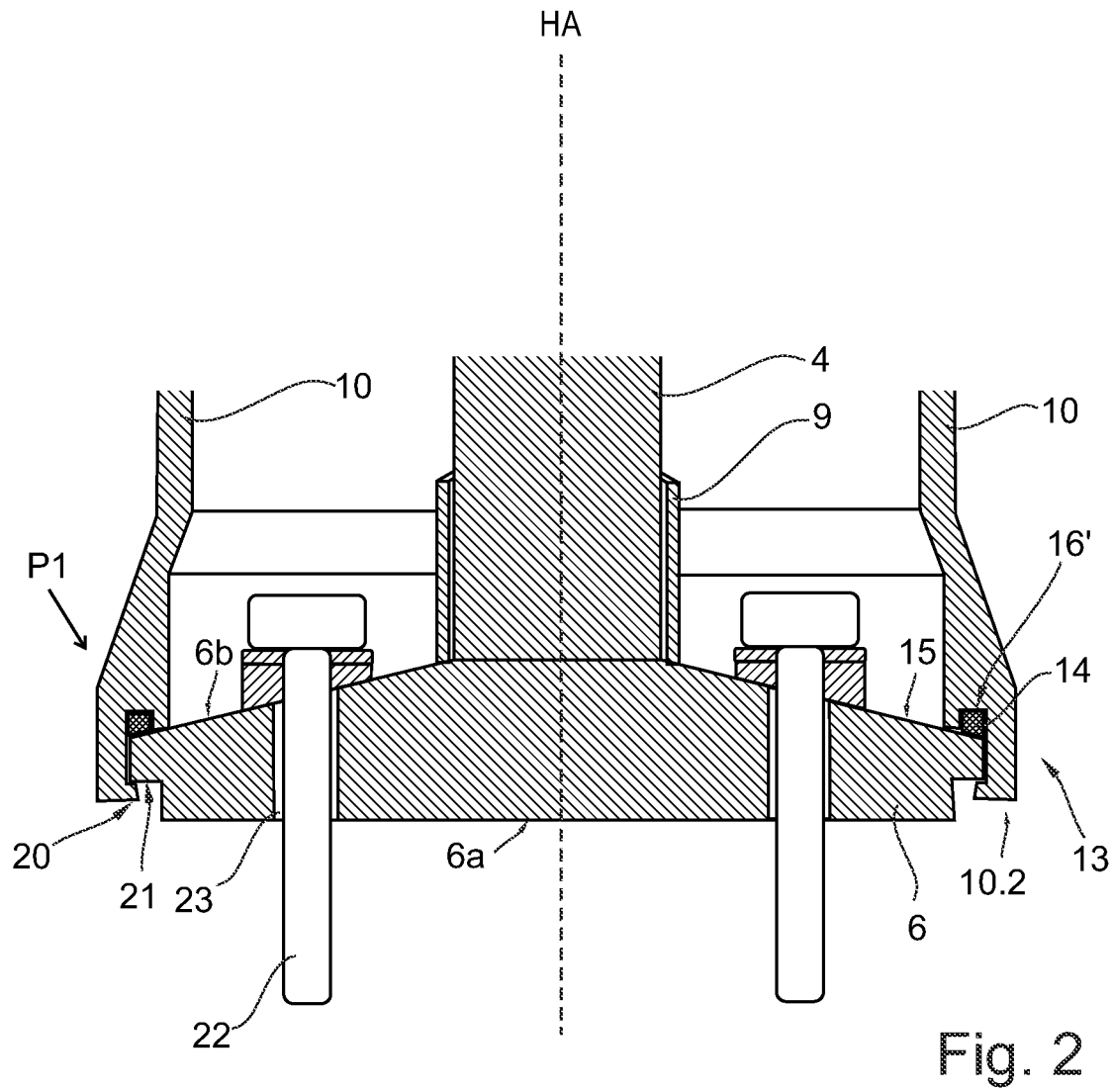
FIG. 2 shows the bottom portion of a machine foot in accordance with at least one possible exemplary embodiment.

Provided at an underside sleeve end 10.2 of the protective sleeve 10 is a connecting section 13 for establishing a connection with the base plate 6 of the carrier unit 2, which is represented only schematically in FIG. 1, but is represented in greater detail in FIG. 2, such that hereinafter reference is likewise made to FIG. 2.

In the example represented, the connection section 13 is configured such as to form a positive fit connection with the base plate 6, such as to form a snap or latch connection, and for this purpose comprises projecting areas 20, serving as engagement noses or projections or shoulders, which enter into a working connection with communicating latch or tab element sections 21 on the base plate 6. For example, for this purpose a corresponding ring rib or shoulder is provided on the base plate 6 as a latch element section 21. The projecting areas 20 formed in the connection section 13 of the protective sleeve 10 engage in this situation behind the ring rib or shoulder 21 of the base plate, as a result of which the connection section 13 hooks into the base plate, with the formation of a latch or snap connection. The protective sleeve 10 can therefore be simply clipped onto the base plate 6.

In accordance with at least one possible exemplary embodiment, a second sealing element 14 is provided on the underside sleeve end 10.2 of the protective sleeve 10 in the region of the connection section 13, which is likewise configured in ring shape as a sealing ring and is arranged in a sealing position between a surface 15 of the base plate 6 and the protective sleeve 10, in such a way that the sealing ring 14 is in sealing contact against the surface 15 of the base plate 6 as well as against an inner wall area of the protective sleeve 10. In the example represented, the sealing ring 14 is at least partially accommodated in a circumferential groove 16' in the region of the connection section 13 of the protective sleeve 10.

The machine foot 1 of the example shown is configured for anchoring in the ground or for securing to the hall floor, and is configured as what is referred to as an "earthquake-resistant" variant. For this purpose the base plate 6 comprises several passage holes 23, of which two are visible in FIGS. 1 and 2. Introduced through each of the passage holes 23 is an anchoring structure or device 22 for the anchoring engagement in the ground. The machine foot can of course also be configured without such an anchoring mechanism, such as a simple standing foot without passage holes 23 and anchoring structures 22. With all embodiment variants, in order to increase the slip resistance, the underside 6a of the base plate 6, configured as a standing surface, can be provided with an adherence coating, or an adherence layer, such as a rubber mat, can be applied to it.

In accordance with at least one possible exemplary embodiment, the protective sleeve 10 also covers the passage holes 23 and anchor structures 22 provided in the base plate 6 completely against the environment, such that these functional elements of the machine foot 1 are also protected in their entirety against dirt contamination and residue deposits, or at least protected such that contamination is restricted or minimized to an acceptable level or degree.

Figure 3:
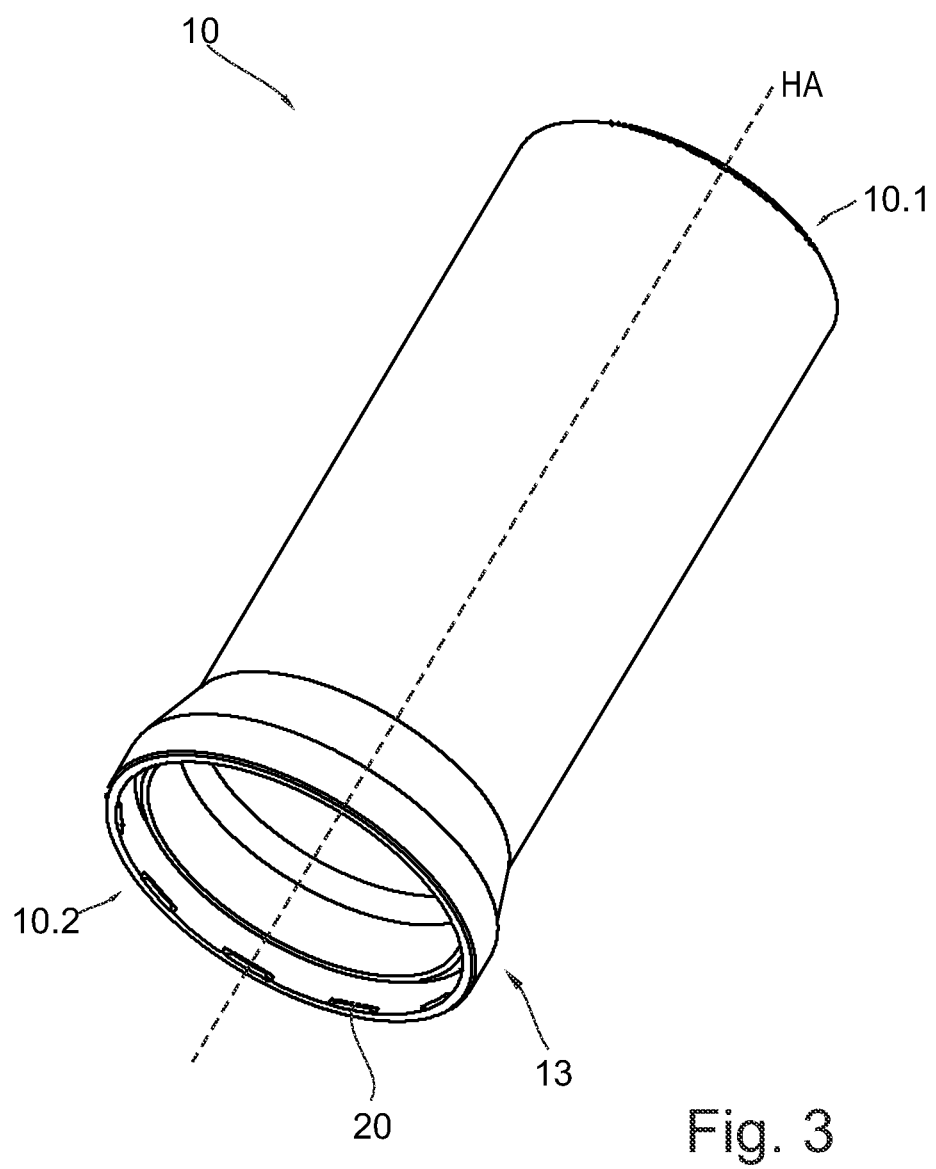
FIG. 3 shows a perspective view of a protective sleeve in accordance with at least one possible exemplary embodiment.

FIG. 3 shows in a perspective view and represented in isolation an embodiment of the protective sleeve 10. The protective sleeve 10, configured essentially as a hollow cylinder, comprises on its underside sleeve end 10.2, in the region of the connection section 13, several projecting areas 20 for latching onto the base plate 6 of the carrying unit 2.

The protective sleeve 10 can be made of special steel or plastic or other suitable material.

For the first installation of the machine foot 1, such as for the mounting of the protective sleeve 10 on the machine foot 1, for example first the carrying spindle 4 and the load sleeve 5 can be assembled together, and then the support unit 3 can be connected to the load sleeve 5. Next, the protective sleeve 10 can be pushed onto the carrying spindle 4 connected to the load sleeve 5, for example from below, and then guided or pushed over the support unit 3, such that finally a lower end, opposite the top side free end portion 4.1 of the carrying spindle 4, can be connected to the base plate 6.

In accordance with at least one possible exemplary embodiment, first the protective sleeve 10 can be slid or moved onto the support unit 3, with the protective sleeve 10 being moved along the support unit 3 in a telescoping manner until the protective sleeve 10 either abuts the securing section 17 or substantially overlaps the support unit 3. The load sleeve 5 can be connected to the support unit 3 either before or after the protective sleeve 10 is installed on the support unit 3. The carrying spindle 4 with connected base plate 6 is then screwed into the load sleeve 5 to a desired position. Once this assembly is complete, the protective sleeve 10 can be axially moved or slid until the connection section 13 connects to and covers the base plate 6.

Figure 4A:
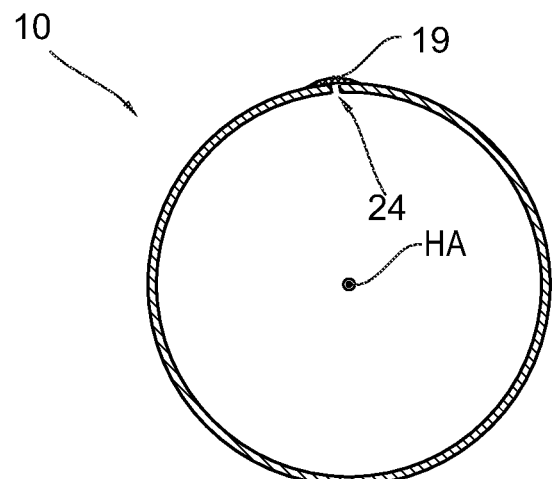
FIG. 4a shows a schematic cross-sectional view of a protective sleeve in accordance with at least one possible exemplary embodiment.
Figure 4B:
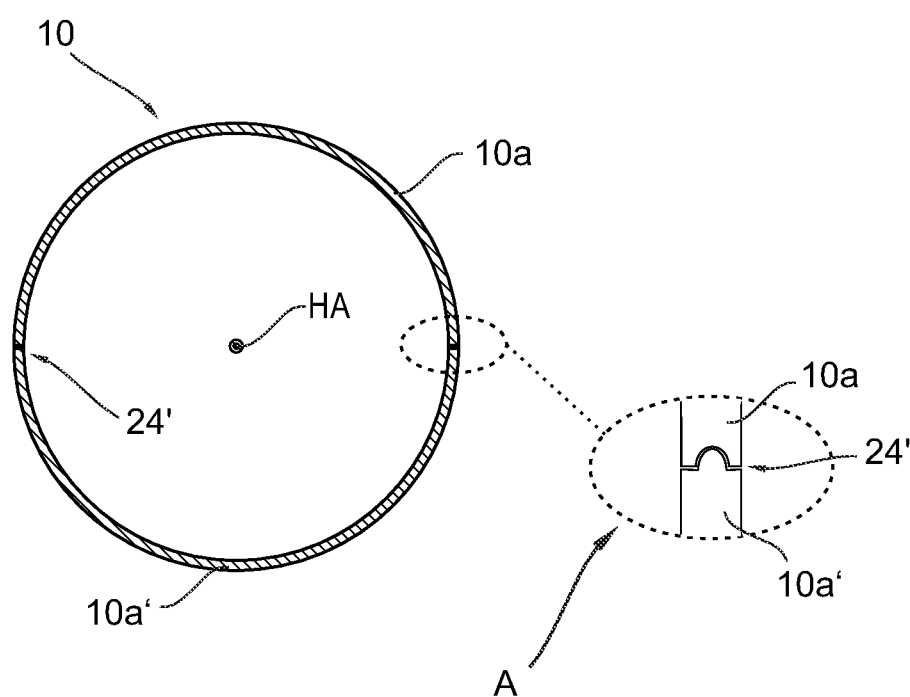
FIG. 4b shows a schematic cross-sectional view of a protective sleeve in accordance with at least one possible exemplary embodiment.

FIGS. 4*a* and 4*b* show schematic cross-section views of embodiments of the protective sleeve 10. If a plastic or similar material is used with sufficiently flexible or elastic properties, the protective sleeve 10 can be formed from a curved piece of flat material, which has been shaped into a cylinder or bent into an essentially cylindrical structure, as represented in FIG. 4*a*. The shaped cylinder is adequately stabilized or stable for the cylinder shape to be bent into shape simply by the appropriate use of force. In this situation, free longitudinal edges of the piece of flat material are then arranged in contact with one another and connected to one another with sealing effect along a connection line or seam line 24, such as in a detachable manner. In the example represented, a sealing strip 19 is applied along the contact edges or along the seam line 24 in order to form the sealing connection, which sealing strip 19 could be removable.

Shown in FIG. 4*b* is a multi-part protective sleeve 10, formed from two hemispherical protective sleeve parts 10*a*, 10*a*'. The hemispherical protective sleeve parts 10*a*, 10*a*' are connected to one another with sealing effect in order to form the protective sleeve 10 running around the periphery. In order to connect the hemispherical protective sleeve parts 10*a*, 10*a*', the respective adjacent longitudinal edges of the protective sleeve parts 10*a*, 10*a*' connected to one another are connected with sealing effect along contact lines or seam lines 24'. For example, the longitudinal edges of the protective sleeve parts 10*a*, 10*a*' are formed with a profile format, such as for a connection of the tongue and groove type, as can be seen from the enlarged section A from FIG. 4*b*. However, any suitable interlocking or interconnecting design or configuration could be used to connect the protective sleeve parts 10*a*, 10*a*'.

In the embodiment shown in FIG. 4*b*, each protective sleeve part 10*a*, 10*a*' therefore comprises a longitudinal edge with a tongue-type profile and an opposing longitudinal edge with a groove profile. In order to form the circumferential protective sleeve 10, the protective sleeve parts 10*a*, 10*a*' are arranged in relation to one another in such a way that in each case two corresponding longitudinal edges connect to one another along the seam lines 24', with the formation of a tongue-and-groove connection. In this situation, seals (not shown) can additionally also be used, such as, for example, sealing lips or sealing strips.

The following is at least a partial list of components shown in the figures and their related reference numerals: machine foot 1; carrier unit 2; support unit 3; machine-side end 3.1; contact end 3.2; carrying spindle 4; top side free end section of the carrying spindle 4.1; load sleeve 5; collar section 5.1; base plate 6; underside of the base plate 6*a*; upper side of the base plate 6*b*; external threaded portion 7; internal threaded portion 8; receiving holder 9; protective sleeve 10; protective sleeve parts 10*a*, 10*a*'; top side sleeve end 10.1; underside sleeve end 10.2; first sealing element 11; outer side of the support unit 12; connection section 13; second sealing element 14; base plate surface 15; circumferential groove 16, 16'; securing section 17; floor section 18; sealing strip 19; projecting area 20; latch element sections 21; anchoring means 22; passage opening 23; seam line 24, 24'; main axis HA; vertical end position P1; vertical direction Rv; and enlarged section A.

At least one possible exemplary embodiment of the present application relates to a machine foot (1) for container handling machines, comprising at least one height-adjustable carrier unit (2) extending along a main axis (HA), and at least one support unit (3) arranged co-axially in relation to the carrier unit (2), wherein the carrier unit (2) comprises at least one carrying spindle (4) connected to a base plate (6) and a load sleeve (5) axially surrounding portions of the carrying spindle (4), wherein the carrying spindle (4) comprises at least one external thread portion (7) and the load sleeve (5) comprises at least one corresponding internal thread portion (8), wherein the load sleeve (5) is adjustably connected to the carrying spindle (4), and wherein the support unit (3) rests on the load sleeve (5), and a top side free end section (4.1) of the carrying spindle (4) protrudes axially into an interior space of the support unit (3), wherein the machine foot (1) further comprises a coaxially arranged protective sleeve (10) running around the periphery, wherein the protective sleeve (10) is arranged on the support unit (3) such as to be capable of moving in a vertical direction (Rv), and wherein the protective sleeve (10), in at least one vertical end position (P1), shields at least the carrying unit (2) against the environment.

At least one other possible exemplary embodiment of the present application relates to the machine foot, wherein the protective sleeve (10) and the support unit (3) are configured as essentially cylindrical in shape, and are arranged such as to be movable telescopically into and out of one another at least over a predetermined movement range.

At least one other possible exemplary embodiment of the present application relates to the machine foot, wherein, at least at a top side sleeve end (10.1) of the protective sleeve (10), at least one sealing element (11) is provided, wherein the sealing element (11) is arranged with sealing effect between an outer side (12) of the support unit (3) and the protective sleeve (10).

At least one other possible exemplary embodiment of the present application relates to the machine foot, wherein at least one second sealing element (14) is provided in the region of an underside sleeve end (10.2) of the protective sleeve (10), wherein the sealing element (14) is arranged with sealing effect between a surface (15) of the base plate (6) and the protective sleeve (10).

At least one other possible exemplary embodiment of the present application relates to the machine foot, wherein the first and/or the second sealing element (11, 14) are configured in a ring shape in the form of a sealing ring.

At least one other possible exemplary embodiment of the present application relates to the machine foot, wherein the protective sleeve (10) comprises, in the area of its top side sleeve end (10.1) and/or in the area of its underside sleeve end (10.2), a circumferential groove (16, 16') for at least the partial receiving of the sealing ring (11, 14).

At least one other possible exemplary embodiment of the present application relates to the machine foot, wherein at least one connection section (13) is provided at the underside sleeve end (10.2) of the protective sleeve (10) in order to provide a detachable connection with the base plate (6).

At least one other possible exemplary embodiment of the present application relates to the machine foot, wherein the connection section (13) for providing a positive-fit detachable connection to the base plate (6) is configured as a latch connection or snap connection, and for this purpose comprises at least one projecting area serving as a latch nose.

At least one other possible exemplary embodiment of the present application relates to the machine foot, wherein the protective sleeve (10) in the vertical end position (P1) shields the carrying unit (2) with sealing effect from the environment, such as completely and with sealing effect against the environment.

At least one other possible exemplary embodiment of the present application relates to the machine foot, wherein, at a machine-side end (3.1) of the support unit (3), facing away from the carrying unit (2), a securing section (17) is provided for securing to the container handling machine.

At least one other possible exemplary embodiment of the present application relates to the machine foot, wherein on the top side of the load sleeve (5) a collar section (5.1) is provided, for the load-bearing receiving of the support unit (3), and the support unit (3) is mounted on the collar section (5.1).

At least one other possible exemplary embodiment of the present application relates to the machine foot, wherein the support unit (3) comprises, at a contact end (3.2) opposite the machine-side end (3.1), a floor section (18) with a central passage opening for the passage of the carrying spindle (4), wherein the floor section (18) of the support unit (3) lies on the load sleeve (5) and is connected to it.

At least one other possible exemplary embodiment of the present application relates to the machine foot, wherein the protective sleeve (10) is configured as multi-part, wherein several protective sleeve parts (10a), in hemispherical or partly spherical form, are connected to one another with sealing effect, in order to form the circumferential protective sleeve (10).

At least one other possible exemplary embodiment of the present application relates to the machine foot, wherein the protective sleeve (10) is made of metal, or from special steel or from plastic.

At least one other possible exemplary embodiment of the present application relates to the machine foot, wherein the base plate (6) comprises one or more passage openings (23), and anchoring means (22) for anchored engagement in the floor which are introduced through the passage openings (23).

At least one possible exemplary embodiment of the present application relates to a protective sleeve (10) for a machine foot (1), comprising at least one height-adjustable carrier unit (2) and a support unit (3), wherein the carrier unit (2) comprises at least one carrying spindle (4) with an external thread (7), connected to a base plate (6), and a load sleeve (5) axially surrounding the carrying spindle (4) in sections, with at least one corresponding internal threaded portion (8), wherein the load sleeve (5) is adjustably connected to the carrying spindle (4), and the support unit (3) rests on the load sleeve (5), in such a way that a top side free end section (4.1) of the carrying spindle (4) protrudes axially into an interior space of the support unit (3), wherein the protective sleeve (10) is configured in the form of a hollow cylinder, and can be connected to the support unit (3) in such a way that the protective sleeve (10) runs around the periphery of the support unit (3) and can be displaced in a vertical direction (Rv) relative to the support unit (3), and wherein the protective sleeve (10) is further configured and arranged, when in the state of being connected to the support unit (3) of the machine foot (1), in at least one vertical end position (P1) so as to shield the carrying unit (2) against the environment.

At least one possible exemplary embodiment of the present application relates to a container handling machine foot to support at least a portion of a container handling machine or a beverage bottling machine configured to handle containers, such as bottles, cans, and similar containers, configured to hold a liquid product, such as a beverage or other liquid product, said container handling machine foot comprising: a carrier arrangement being configured to be mounted or disposed on a floor of a container handling plant; said carrier arrangement being adjustable along a central axis thereof to permit adjustment of the overall length of the container handling machine foot; said carrier arrangement comprising: a carrying spindle comprising a first end portion, a second end portion, and a body portion; a base plate connected to said second end portion of said carrying spindle; and a load sleeve arrangement being connected to and disposed to surround a portion of said carrying spindle; said carrying spindle comprising at least one external thread portion disposed on an outer surface of said body portion of said carrying spindle; said load sleeve arrangement comprising at least one internal thread portion disposed on an inner surface of said load sleeve arrangement; said at least one external thread portion of said carrying spindle being configured and disposed to engage with said at least one internal thread portion of said load sleeve arrangement to permit relative axial adjustment of said carrying spindle and said load sleeve arrangement with respect to one another; a support arrangement being disposed co-axially or essentially co-axially with said carrier arrangement; said support arrangement being connected to said load sleeve arrangement to permit said support arrangement to be supported by said load sleeve arrangement upon installation of said container handling machine foot; at least said first end portion of said carrying spindle being disposed in an interior space of said support arrangement; a sleeve arrangement being disposed co-axially or essentially co-axially with said carrier arrangement; said sleeve arrangement being disposed to surround at least a portion of said support arrangement; said sleeve arrangement being axially movable with respect to said support arrangement; and said sleeve arrangement being configured and disposed to surround and shield at least uncovered portions of said carrier arrangement from the surrounding environment.

At least one other possible exemplary embodiment of the present application relates to the container handling machine foot, wherein: said sleeve arrangement is essentially cylindrical; said support arrangement is essentially cylindrical; and said sleeve arrangement and said support arrangement are configured and disposed to be moved telescopically with respect to one another over at least a predetermined movement range.

At least one other possible exemplary embodiment of the present application relates to the container handling machine foot, wherein: said sleeve arrangement comprises a first end portion disposed at said support arrangement and a second end portion disposed at said base plate; and said sleeve arrangement comprising at least one first sealing element disposed at said first end portion and configured to provide a seal between an outer side of said support arrangement and said sleeve arrangement.

At least one other possible exemplary embodiment of the present application relates to the container handling machine foot, wherein said sleeve arrangement comprises at least one second sealing element disposed at said second end portion and configured to provide a seal between a surface of said base plate and said sleeve arrangement.

At least one other possible exemplary embodiment of the present application relates to the container handling machine foot, wherein at least one of (A) and (B): (A) said at least one first sealing element comprises a sealing ring; and (B) said at least one second sealing element comprises a sealing ring.

At least one other possible exemplary embodiment of the present application relates to the container handling machine foot, wherein at least one of (C) and (D): (C) said first end portion of said sleeve arrangement comprises a circumferential groove configured to receive at least a portion of said at least one first sealing element; and (D) said second end portion of said sleeve arrangement comprises a circumferential groove configured to receive at least a portion of said at least one second sealing element.

At least one other possible exemplary embodiment of the present application relates to the container handling machine foot, wherein said second end portion of said sleeve arrangement comprises a connection section being detachably connected to said base plate.

At least one other possible exemplary embodiment of the present application relates to the container handling machine foot, wherein: said connection section is connected to said base plate in a snap fit connection; said base plate comprises a projecting structure; and said connection section comprises a resilient latch structure configured to be temporarily displaced by said projecting structure upon connection to said base plate, and configured to snap back from displacement upon movement of said latch structure past said projecting structure.

At least one other possible exemplary embodiment of the present application relates to the container handling machine foot, wherein said sleeve arrangement is configured and disposed to completely seal said carrier arrangement against the surrounding environment.

At least one other possible exemplary embodiment of the present application relates to the container handling machine foot, wherein: said support arrangement comprises a first end portion and a second end portion; and the container handling machine foot further comprises a securing arrangement disposed at said second end portion of said support arrangement and configured to connect said support arrangement to a container handling machine.

At least one other possible exemplary embodiment of the present application relates to the container handling machine foot, wherein: said load sleeve arrangement comprises a collar section; and said collar section is connected to said first end portion of said support arrangement to support said support arrangement thereon.

At least one other possible exemplary embodiment of the present application relates to the container handling machine foot, wherein: said first end portion of said support arrangement comprises an end structure configured and disposed to face and engage with said collar section; and said end structure comprises a central passage opening configured to permit said carrying spindle to pass through said end structure.

At least one other possible exemplary embodiment of the present application relates to the container handling machine foot, wherein: said sleeve arrangement comprises at least two sleeve arrangement components having an essentially hemispherical or partly spherical form; and said at least two sleeve arrangement components are connected to one another in a sealed manner to form said sleeve arrangement with sealing effect.

At least one other possible exemplary embodiment of the present application relates to the container handling machine foot, wherein said sleeve arrangement comprises at least one of metal, special steel, and plastic.

At least one other possible exemplary embodiment of the present application relates to the container handling machine foot, wherein: said base plate comprises at least one passage opening; and the container handling machine foot further comprises at least one anchoring structure disposed to pass through said at least one passage opening and configured to anchor said base plate to a floor structure.

At least one possible exemplary embodiment of the present application relates to a container handling machine foot sleeve arrangement configured to support at least a portion of a container handling machine or a beverage bottling machine configured to handle containers, such as bottles, cans, and similar containers, configured to hold a liquid product, such as a beverage or other liquid product, said container handling machine foot sleeve arrangement comprising: a sleeve being configured in the shape of a hollow cylinder; said sleeve being configured to be disposed to surround at least a portion of a carrier arrangement and a support arrangement of a container handling machine foot, which carrier arrangement and support arrangement are configured to be connected together, wherein a portion of said carrier arrangement is configured to be covered by at least said support arrangement, and are configured to be relatively axial adjustable with respect to one another to permit adjustment of the overall length of the container handling machine foot; said sleeve being configured to be movable with respect to a carrier arrangement to permit adjustment of a position of said sleeve; and said sleeve being configured to be disposed to surround and shield at least uncovered portions of a carrier arrangement from the surrounding environment.

At least one other possible exemplary embodiment of the present application relates to the container handling machine foot sleeve arrangement, wherein: said sleeve comprises a first end portion and a second end portion; the container handling machine foot sleeve arrangement comprises at least one first sealing element disposed at said first end portion and configured to provide a seal between an outer side of a support arrangement of a container handling machine foot and said sleeve arrangement; and the container handling machine foot sleeve arrangement comprises at least one second sealing element disposed at said second end portion and configured to provide a seal between a surface of a base plate of a container handling machine foot and said sleeve arrangement.

At least one other possible exemplary embodiment of the present application relates to the container handling machine foot sleeve arrangement, wherein: said second end portion comprises a connection section configured to be detachably connected to a base plate of a container handling machine foot; and said connection section is configured to be connected to the base plate in a snap fit connection, wherein said connection section comprises a resilient latch structure configured to be temporarily displaced upon connection to the base plate and to snap back from displacement upon movement of said latch structure past a projecting structure of the base plate.

At least one other possible exemplary embodiment of the present application relates to the container handling machine foot sleeve arrangement, wherein: said sleeve is configured to be disposed to surround a spindle configured to adjustably connect the base plate to a support arrangement of a container handling machine foot, which spindle is configured to be at least partially inserted into the support arrangement and axially adjusted with respect to the support arrangement; and the container handling machine foot sleeve arrangement is configured to be connected to the base plate and movable with the base plate, and said sleeve having a length at least as long as the length of the spindle, such that, upon the spindle being axially moved further into or out of the support arrangement, said sleeve is disposed to cover the portion of the spindle not covered by the support arrangement, irrespective of the amount of insertion of the spindle into the support arrangement, to surround and shield the spindle against the surrounding environment.

At least one other possible exemplary embodiment of the present application relates to the container handling machine foot sleeve arrangement, wherein said second end portion comprises a connection section configured to be detachably connected to a base plate of a container handling machine foot to secure said sleeve to said base plate and permit detachment and axial displacement of said sleeve to permit maintenance or repair access to components of the container handling machine foot disposed within said sleeve.

Any numerical values disclosed herein, if any, should be understood as disclosing all approximate values within plus or minus ten percent of the numerical value. Any ranges of numerical values disclosed herein, if any, should be understood as disclosing all individual values within the range of values, including whole numbers, tenths of numbers, or hundredths of numbers.

The entirety of the appended drawings, including all dimensions, proportions, and/or shapes disclosed thereby or reasonably understood therefrom, are hereby incorporated by reference.

All of the patents, patent applications, patent publications, and other documents cited herein, are hereby incorporated by reference as if set forth in their entirety herein.

The corresponding foreign or international patent applications, as originally filed and as published, from which the present application claims the benefit of priority, are hereby incorporated by reference as if set forth in their entirety herein, as follows: PCT/EP2020/071779, WO2021037486, and DE102019122801.8.

The following patents, patent applications, patent publications, and other documents cited in the corresponding foreign or international patent applications listed in the preceding paragraph are hereby incorporated by reference as if set forth in their entirety herein, as follows: US2006186288A1; US2011187247A1; U.S. Pat. No. 7,159,829B1; U.S. Pat. No. 6,520,461B1; EP1021972A1; CH698093A2; DE102016118047A1; and WO2015192849A1.

Although the invention has been described in detail for the purpose of illustration of any embodiments disclosed herein, including the most practical or preferred embodiments at the time of filing of this application, it is to be understood that such detail is solely for that purpose and that the invention is not limited to such embodiments, but, on the contrary, is intended to cover modifications and equivalent arrangements that are within the spirit and scope of the present application, including the specification and the claims as originally filed, as amended, or as issued. For example, it is to be understood that the present invention contemplates that, to the extent possible, one or more features or components of any disclosed embodiment can be combined with one or more features or components of any other disclosed embodiment.

What is claimed is:

1. A container handling machine foot to support at least a portion of a container handling machine or a beverage bottling machine configured to handle containers, such as bottles, cans, and similar containers, configured to hold a liquid product, such as a beverage or other liquid product, said container handling machine foot comprising:
    a carrier arrangement being configured to be mounted or disposed on a floor of a container handling plant;
    said carrier arrangement being adjustable along a central axis thereof to permit adjustment of an overall length of the container handling machine foot;
    said carrier arrangement comprising:
    a carrying spindle comprising a first end portion, a second end portion, and a body portion;
    a base plate connected to said second end portion of said carrying spindle;
    and a load sleeve arrangement being connected to and disposed to surround a portion of said carrying spindle;
    said carrying spindle comprising at least one external thread portion disposed on an outer surface of said body portion of said carrying spindle;
    said load sleeve arrangement comprising at least one internal thread portion disposed on an inner surface of said load sleeve arrangement;
    said at least one external thread portion of said carrying spindle being configured and disposed to engage with said at least one internal thread portion of said load sleeve arrangement to permit relative axial adjustment of said carrying spindle and said load sleeve arrangement with respect to one another;
    a support arrangement being disposed co-axially or essentially co-axially with said carrier arrangement;
    said support arrangement being connected to said load sleeve arrangement to permit said support arrangement to be supported by said load sleeve arrangement upon installation of said container handling machine foot;
    at least said first end portion of said carrying spindle being disposed in an interior space of said support arrangement;
    a sleeve arrangement being disposed co-axially or essentially co-axially with said carrier arrangement;
    said sleeve arrangement being disposed to surround at least a portion of said support arrangement;
    said sleeve arrangement being axially movable with respect to said support arrangement; and
    said sleeve arrangement being configured and disposed to surround and shield at least uncovered portions of said carrier arrangement from a surrounding environment; and
    said sleeve arrangement having a first end portion disposed at said support arrangement and a second end portion disposed at said base plate, said second end portion of said sleeve arrangement having a connection section being detachably connected to said base plate, and said connection section being connected to said base plate in a snap fit connection;

said base plate having a projecting structure, and said connection section having a resilient latch structure configured to be temporarily displaced by said projecting structure upon connection to said base plate, and configured to snap back from displacement upon movement of said latch structure past said projecting structure wherein said base plate comprises at least one passage opening; and the container handling machine foot further comprises at least one anchoring structure disposed to pass through said at least one passage opening and configured to anchor said base plate to the floor of the container handling plant.

2. The container handling machine foot according to claim 1, wherein:
said sleeve arrangement is essentially cylindrical;
said support arrangement is essentially cylindrical; and
said sleeve arrangement and said support arrangement are configured and disposed to be moved telescopically with respect to one another over at least a predetermined movement range.

3. The container handling machine foot according to claim 2, wherein
said sleeve arrangement has at least one first sealing element disposed at said first end portion of said sleeve arrangement and configured to provide a seal between an outer side of said support arrangement and said sleeve arrangement.

4. The container handling machine foot according to claim 3, wherein
said sleeve arrangement comprises at least one second sealing element disposed at said second end portion of said sleeve arrangement and configured to provide a seal between a surface of said base plate and said sleeve arrangement.

5. The container handling machine foot according to claim 4, wherein at least one of (A) and (B):
(A) said at least one first sealing element comprises a first sealing ring; and
(B) said at least one second sealing element comprises a second sealing ring.

6. The container handling machine foot according to claim 5, wherein at least one of (C) and (D):
(C) said first end portion of said sleeve arrangement comprises a circumferential groove configured to receive at least a portion of said at least one first sealing element; and
(D) said second end portion of said sleeve arrangement comprises a circumferential groove configured to receive at least a portion of said at least one second sealing element.

7. The container handling machine foot according to claim 1, wherein said sleeve arrangement is configured and disposed to completely seal said carrier arrangement against the surrounding environment.

8. The container handling machine foot according to claim 7, wherein:
said support arrangement comprises a first end portion and a second end portion; and the container handling machine foot further comprises a securing arrangement disposed at said second end portion of said support arrangement and configured to connect said support arrangement to a container handling machine.

9. The container handling machine foot according to claim 8, wherein:
said load sleeve arrangement comprises a collar section; and said collar section is connected to said first end portion of said support arrangement to support said support arrangement thereon.

10. The container handling machine foot according to claim 9, wherein:
said first end portion of said support arrangement comprises an end structure configured and disposed to face and engage with said collar section; and
said end structure comprises a central passage opening configured to permit said carrying spindle to pass through said end structure.

11. The container handling machine foot according to claim 10, wherein:
said sleeve arrangement comprises at least two sleeve arrangement components having an essentially hemispherical or partly spherical form; and
said at least two sleeve arrangement components are connected to one another in a sealed manner to form said sleeve arrangement with sealing effect.

12. The container handling machine foot according to claim 11, wherein said sleeve arrangement comprises at least one of metal, special steel, and plastic.

13. A container handling machine foot sleeve arrangement configured to support at least a portion of a container handling machine or a beverage bottling machine configured to handle containers, such as bottles, cans, and similar containers, configured to hold a liquid product, such as a beverage or other liquid product, said container handling machine foot sleeve arrangement comprising:
a sleeve being configured in the shape of a hollow cylinder;
said sleeve being configured to be disposed to surround at least a portion of a carrier arrangement and a support arrangement of a container handling machine foot, said carrier arrangement and said support arrangement are configured to be connected together, wherein a portion of said carrier arrangement is configured to be covered by at least said support arrangement, and are configured to be relatively axial adjustable with respect to one another to permit adjustment of an overall length of the container handling machine foot;
said sleeve being configured to be movable with respect to said carrier arrangement to permit adjustment of a position of said sleeve; and
said sleeve being configured to be disposed to surround and shield at least uncovered portions of said carrier arrangement from a surrounding environment; and
said sleeve having a first end portion and a second end portion, said second end portion having a connection section configured to be detachably connected to a base plate of the container handling machine foot; and
said connection section being configured to be connected to the base plate in a snap fit connection, said connection section having a resilient latch structure configured to be temporarily displaced upon connection to the base plate and to snap back from displacement upon movement of said latch structure past a projecting structure of the base plate
wherein the base plate comprises at least one passage opening; and the container handling machine foot further comprises at least one anchoring structure disposed to pass through said at least one passage opening and configured to anchor the base plate to a floor of a container handling plant.

14. The container handling machine foot sleeve arrangement according to claim 13, wherein:

at least one first sealing element disposed at said first end portion and configured to provide a seal between an outer side of said support arrangement of said container handling machine foot and said sleeve arrangement; and wherein at least one second sealing element disposed at said second end portion and configured to provide a seal between a surface of the base plate of the container handling machine foot and said sleeve.

15. The container handling machine foot sleeve arrangement according to claim 13,
wherein:
said sleeve is configured to be disposed to surround a spindle configured to adjustably connect the base plate to a support arrangement of a container handling machine foot, said spindle is configured to be at least partially inserted into the support arrangement and axially adjusted with respect to the support arrangement;
and the container handling machine foot sleeve arrangement is configured to be connected to the base plate and movable with the base plate, and said sleeve having a length at least as long as a length of the spindle, such that, upon the spindle being axially moved further into or out of the support arrangement, said sleeve is disposed to cover the portion of the spindle not covered by the support arrangement, irrespective of an amount of insertion of the spindle into the support arrangement, to surround and shield the spindle against the surrounding environment.

16. The container handling machine foot sleeve arrangement according to claim 15, wherein said second end portion comprises a connection section configured to be detachably connected to the base plate of the container handling machine foot to secure said sleeve to said base plate and permit detachment and axial displacement of said sleeve to permit maintenance or repair access to components of the container handling machine foot disposed within said sleeve.

* * * * *